(12) United States Patent
Ciudad et al.

(10) Patent No.: US 8,122,378 B2
(45) Date of Patent: Feb. 21, 2012

(54) IMAGE CAPTURE AND MANIPULATION

(75) Inventors: Jean-Pierre Ciudad, San Francisco, CA (US); Erika Misaki, San Francisco, CA (US); Michael Stochosky, San Francisco, CA (US); Mike Matas, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 776 days.

(21) Appl. No.: 11/811,330

(22) Filed: Jun. 8, 2007

(65) Prior Publication Data
US 2008/0307307 A1 Dec. 11, 2008

(51) Int. Cl.
*G06F 3/048* (2006.01)
(52) U.S. Cl. ........................................ 715/838; 715/839
(58) Field of Classification Search .................. 715/838, 715/839, 719, 769, 846; 716/719
See application file for complete search history.

(56) References Cited

U.S. PATENT DOCUMENTS

| 4,881,127 A | 11/1989 | Isoguchi et al. |
| 5,262,815 A | 11/1993 | Aumiller |
| 5,402,513 A | 3/1995 | Schafer |
| 5,459,529 A | 10/1995 | Searby et al. |
| 5,519,828 A | 5/1996 | Rayner |
| 5,534,917 A | 7/1996 | MacDougall |
| 5,670,985 A | 9/1997 | Cappels, Sr. et al. |
| 5,687,306 A | 11/1997 | Blank |
| 5,726,672 A | 3/1998 | Hernandez et al. |
| 5,737,552 A | 4/1998 | Lavallee et al. |
| 5,748,775 A | 5/1998 | Tsuchikawa et al. |
| 5,752,029 A | 5/1998 | Wissner |
| 5,778,108 A | 7/1998 | Coleman, Jr. |
| 5,781,198 A | 7/1998 | Korn |
| 5,812,787 A | 9/1998 | Astle |
| 5,854,893 A | 12/1998 | Ludwig et al. |
| 5,914,748 A | 6/1999 | Parulski et al. |
| 5,923,791 A | 7/1999 | Hanna et al. |
| 5,956,026 A | 9/1999 | Ratakonda |
| 5,995,095 A | 11/1999 | Ratakonda |
| 6,064,438 A | 5/2000 | Miller |
| 6,111,562 A | 8/2000 | Downs et al. |
| 6,148,148 A | 11/2000 | Wain et al. |
| 6,230,172 B1 | 5/2001 | Purnaveja et al. |
| 6,237,025 B1 | 5/2001 | Ludwig et al. |
| 6,298,197 B1 | 10/2001 | Wain et al. |
| 6,307,550 B1 | 10/2001 | Chen et al. |
| 6,344,874 B1 | 2/2002 | Helms et al. |
| 6,351,762 B1 | 2/2002 | Ludwig et al. |
| 6,400,374 B2 | 6/2002 | Lanier |

(Continued)

FOREIGN PATENT DOCUMENTS
EP  1 217 598  6/2002
(Continued)

OTHER PUBLICATIONS

20/20 Color MD™ Because it's more fun taking photos than fixing photos, (2005), *available at* http://www.phototune.com/2020_intro.html.

(Continued)

*Primary Examiner* — Omar Abdul-Ali
(74) *Attorney, Agent, or Firm* — Fish & Richardson P.C.

(57) ABSTRACT

The present disclosure includes, among other things, systems, methods and program products for image capture and manipulation.

26 Claims, 13 Drawing Sheets
(10 of 13 Drawing Sheet(s) Filed in Color)

U.S. PATENT DOCUMENTS

| Patent No. | | Date | Inventor | |
|---|---|---|---|---|
| 6,414,707 | B1* | 7/2002 | Agraharam et al. | 348/14.07 |
| 6,434,266 | B1 | 8/2002 | Kanno et al. | |
| 6,507,286 | B2 | 1/2003 | Weindorf et al. | |
| 6,583,799 | B1* | 6/2003 | Manolis et al. | 715/838 |
| 6,583,806 | B2 | 6/2003 | Ludwig et al. | |
| 6,594,688 | B2 | 7/2003 | Ludwig et al. | |
| 6,624,828 | B1 | 9/2003 | Dresevic et al. | |
| 6,714,216 | B2 | 3/2004 | Abe | |
| 6,715,003 | B1 | 3/2004 | Safai | |
| 6,716,103 | B1 | 4/2004 | Eck et al. | |
| 6,760,042 | B2 | 7/2004 | Zetts | |
| 6,912,327 | B1 | 6/2005 | Hori et al. | |
| 6,933,979 | B2 | 8/2005 | Gonzales et al. | |
| 6,954,894 | B1 | 10/2005 | Balnaves et al. | |
| 6,988,244 | B1 | 1/2006 | Honda et al. | |
| 6,988,248 | B1* | 1/2006 | Tang et al. | 715/839 |
| 7,030,872 | B2 | 4/2006 | Tazaki | |
| 7,064,492 | B1 | 6/2006 | Vijeh | |
| 7,095,392 | B2 | 8/2006 | Lin | |
| 7,095,395 | B2 | 8/2006 | Bu | |
| 7,103,840 | B2 | 9/2006 | Ihara et al. | |
| 7,124,366 | B2 | 10/2006 | Foreman et al. | |
| 7,127,149 | B1 | 10/2006 | Lin | |
| 7,152,093 | B2 | 12/2006 | Ludwig et al. | |
| 7,165,219 | B1 | 1/2007 | Peters et al. | |
| 7,206,809 | B2 | 4/2007 | Ludwig et al. | |
| 7,284,207 | B2* | 10/2007 | Canfield et al. | 715/842 |
| 7,421,470 | B2 | 9/2008 | Ludwig et al. | |
| 7,433,921 | B2 | 10/2008 | Ludwig et al. | |
| 7,546,537 | B2* | 6/2009 | Crawford | 715/753 |
| 7,546,544 | B1 | 6/2009 | Weber et al. | |
| 7,739,599 | B2 | 6/2010 | Patten et al. | |
| 2002/0019833 | A1 | 2/2002 | Hanamoto | |
| 2002/0105589 | A1 | 8/2002 | Brandenberger et al. | |
| 2002/0140740 | A1 | 10/2002 | Chen | |
| 2002/0167540 | A1 | 11/2002 | Dobbelaar | |
| 2002/0180803 | A1 | 12/2002 | Kaplan et al. | |
| 2002/0194195 | A1 | 12/2002 | Fenton et al. | |
| 2002/0198909 | A1 | 12/2002 | Huynh et al. | |
| 2003/0046348 | A1* | 3/2003 | Pinto et al. | 709/206 |
| 2003/0047099 | A1 | 3/2003 | Hanyu | |
| 2003/0067435 | A1 | 4/2003 | Liu | |
| 2003/0090507 | A1 | 5/2003 | Randall et al. | |
| 2003/0189588 | A1 | 10/2003 | Girgensohn et al. | |
| 2003/0193520 | A1 | 10/2003 | Oetzel | |
| 2003/0210261 | A1 | 11/2003 | Wu et al. | |
| 2004/0017390 | A1 | 1/2004 | Knowlton et al. | |
| 2004/0021684 | A1 | 2/2004 | Millner | |
| 2004/0032497 | A1 | 2/2004 | Ying et al. | |
| 2004/0085340 | A1 | 5/2004 | Dimitrova et al. | |
| 2004/0100497 | A1* | 5/2004 | Quillen et al. | 345/751 |
| 2004/0125124 | A1 | 7/2004 | Kim et al. | |
| 2004/0196250 | A1 | 10/2004 | Mehrotra et al. | |
| 2004/0227751 | A1* | 11/2004 | Anders | 345/419 |
| 2004/0233125 | A1 | 11/2004 | Tanghe et al. | |
| 2004/0239799 | A1 | 12/2004 | Suzuki et al. | |
| 2005/0073575 | A1 | 4/2005 | Thacher et al. | |
| 2005/0117811 | A1 | 6/2005 | Hoshino | |
| 2005/0174589 | A1 | 8/2005 | Tokiwa | |
| 2005/0194447 | A1 | 9/2005 | He et al. | |
| 2006/0018653 | A1 | 1/2006 | Kido | |
| 2006/0050151 | A1 | 3/2006 | Fujinawa | |
| 2006/0055828 | A1 | 3/2006 | Henry et al. | |
| 2006/0274161 | A1 | 12/2006 | Ing et al. | |
| 2006/0284895 | A1 | 12/2006 | Marcu et al. | |
| 2007/0009028 | A1* | 1/2007 | Lee et al. | 375/240.08 |
| 2007/0081094 | A1 | 4/2007 | Ciudad et al. | |
| 2007/0081740 | A1 | 4/2007 | Ciudad et al. | |
| 2007/0113181 | A1* | 5/2007 | Blattner et al. | 715/706 |
| 2007/0204238 | A1* | 8/2007 | Hua et al. | 715/838 |
| 2007/0216675 | A1* | 9/2007 | Sun et al. | 345/419 |
| 2008/0129816 | A1* | 6/2008 | Mattila et al. | 348/14.08 |
| 2008/0303949 | A1 | 12/2008 | Ciudad et al. | |
| 2010/0118179 | A1 | 5/2010 | Ciudad et al. | |

FOREIGN PATENT DOCUMENTS

| | | |
|---|---|---|
| EP | 1 775 939 | 4/2007 |
| JP | 2002-335432 | 11/2002 |
| JP | 2004-180245 | 6/2004 |
| JP | 2004-187154 | 7/2004 |
| JP | 2004-260560 | 9/2004 |
| JP | 2004-286781 | 10/2004 |
| JP | 2004-349843 | 12/2004 |
| JP | 2004-350208 | 12/2004 |
| JP | 2005-241814 | 9/2005 |
| JP | 2007-110717 | 4/2007 |
| WO | WO 2004/054239 | 6/2004 |

OTHER PUBLICATIONS

Applegate, J.R., Vivid Details' Test Strip 3.01 Redefining The Art of Image Enhancement, (Jan. 2001), *available at* http://www.edigitalphoto.com/accessories/0101edp_vivid/index.html.

"iChat" [online], retrieved from the Internet on Feb. 18, 2008, 5 pgs. http://en.wikipedia.org/wiki/IChat.

Skin Tune™ Photoshop Plug-in That Automatically Corrects Skin Color, (2005), *available at* http://www.skintune.com.

"Welcome to Mac OS X" (slide presentation), Apple Computer, Inc. (2002), 21 pages.

European Search Report, issued Apr. 9, 2009, in European Application No. 0602105.9.

Office Action, issued Nov. 11, 2008, in Japan Application No. 2006-275583.

Office Action, issued Mar. 17, 2009, in Japan Application No. 2006-275583.

Stone. "iDVD 2—OS 10.1", retrieved from the Internet on Aug. 15, 2009 at : URL : <http://www.kenstone.net/fcp_homepage/basic_idvd_2.html>, Dec. 17, 2001.

* cited by examiner

IMAGE CAPTURE AND MANIPULATION

BACKGROUND

Many software applications now accept image data including animated icons such as head shots to identify, for example, the sender of an electronic mail message, an Internet chat buddy, or to identify a caller on a voice-over-IP communication link. Novice computer users may not know how to associate their picture with these applications. Furthermore, a user may wish to modify their picture before using it. While many software packages provide very sophisticated tools for image editing, novice users can find these packages too cumbersome, especially if the user wants to quickly experiment with different effects.

SUMMARY

In general, one aspect of the subject matter described in this specification can be embodied in a method that includes receiving a video stream and displaying the video stream in a first area of a graphical user interface (GUI), where the video stream includes a time-ordered set of images. A plurality of images are automatically selected from the stream and displaying a placeholder image representative of the plurality in a second area of the GUI. User input is accepted to convert the images into an animation. An animation is produced from the images. An animated icon is produced from the animation. Other implementations of this aspect include corresponding systems, apparatus, and computer program products.

These and other implementations can optionally include one or more of the following features. Each image in the plurality has a background, and for each image in the plurality, the image's respective background is automatically substituted with a new background. The new background is a static image or a movie. Each image in the plurality captures a person, and for each image in the plurality, a filter is applied to the image's respective person, but not applying the filter to other parts of the image. Selecting includes selecting four non-adjacent images from the video stream where the four non-adjacent images are separated by time period. A filter is applied to each image in the video stream, where application of the filter is for the image as a whole or only for a person captured in the image. The filter is incorporated into a standard set of filters. User input is accepted to dynamically adjust one or more parameters of the filter. The icon or a copy of the icon is transferred to an application. The video stream is received from a camera that is positioned in front of a user.

Implementations of the invention can realize one or more of the following advantages. A user can easily obtain and apply effects to an image for use in various applications. Different effects (e.g., using one or more filters) can simultaneously be applied to an image (or image stream) with the results being displayed side-by-side. This allows a user to immediately compare different effects and choose the most desirable one. Image data can easily be transferred to other applications such as email, an address book, contacts, Internet chat, and image organization applications. An image stream can be culled to create a still image, a multi-shot or a movie and filters can be applied to each of these. Filter parameters can be dynamically adjusted by users. Animated buddy icons can be created from multi-shot images or movies. Application of filters can be limited to foreground objects. Image backgrounds can be dynamically replaced with still images or movies.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numbers and designations in the various drawings indicate like elements.

DETAILED DESCRIPTION

Figure 1:
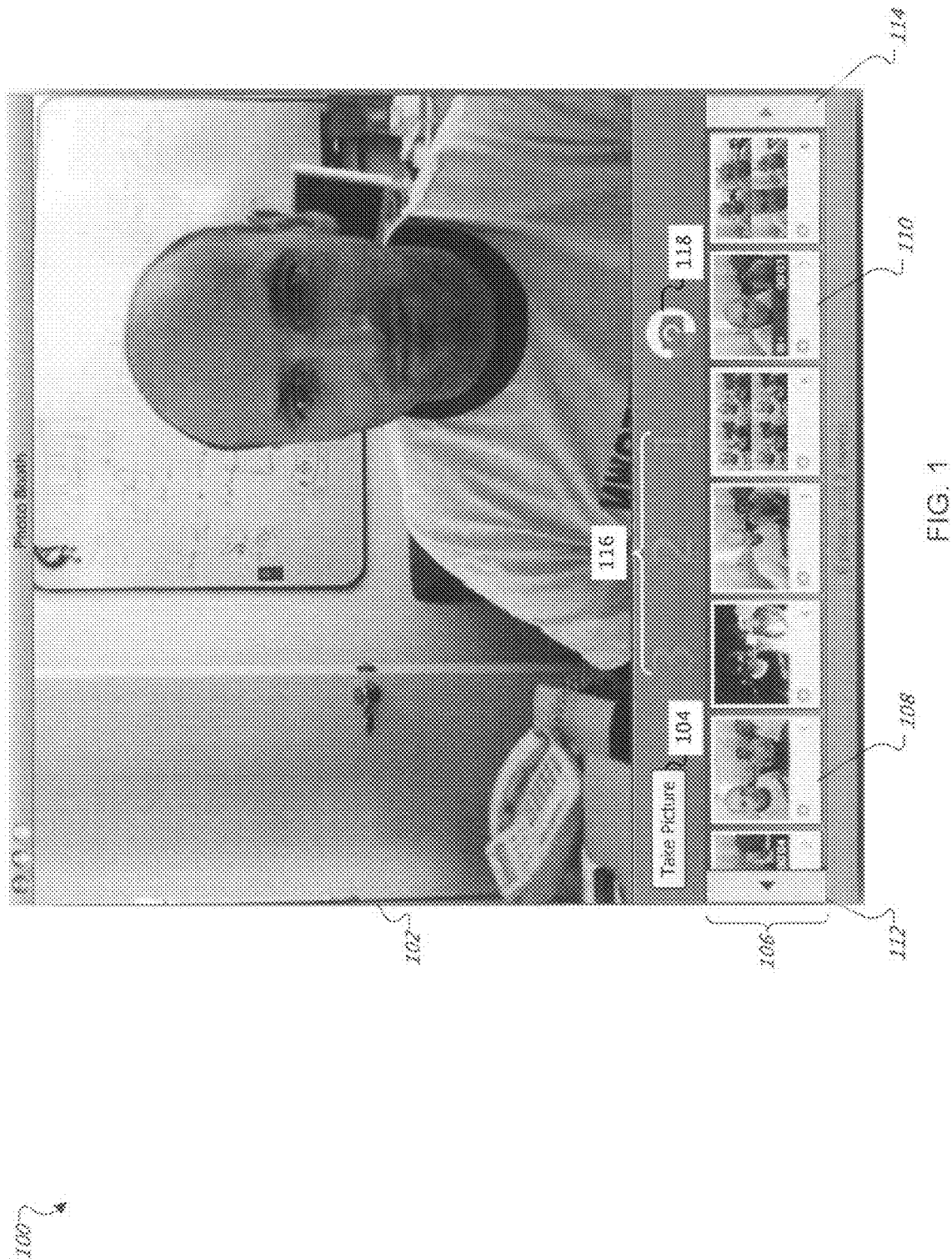
FIG. 1 shows an example GUI for viewing a still image, live image, or a recorded movie.

FIG. 1 shows an example graphical user interface (GUI) for viewing a still image, live image, or a recorded movie. Although a GUI is illustrated, other user interfaces are possible, including user interfaces that allow for user interaction by means of sound, voice, gesture, eye movement and/or use of remote control devices. A still image, live image, or a recorded movie is displayed in region 102 of window 100. For example, images or video may be obtained from an image capture device (e.g., a digital still camera or a digital video camera) integrated with or mounted in or located in proximity to a user's computer display. A button 104 allows the user to switch between a still image and a live image. A live image reflects a continuous or real-time video stream of time ordered images captured by the image capture device. The button 104 can be selected by the user to capture an image or a movie from the video stream.

An image strip 106 presents placeholders which are images representations of previously captured images or movies. By way of illustration, image strip 106 includes placeholder images 108 and 110. Placeholder image 108 represents a previously captured image. Placeholder image 110 represents a previously recorded movie. Alternatively, the image strip 106 is empty if there are no captured images. Alternatively, the image strip is not presented. The image strip 106 can hold more images than can be displayed. A user can scroll to the left or to the right through images using scroll buttons (112 and 114). The images in the image strip can be sorted in order of the date and/or time that they were captured, the date and/or time they were last modified, or other suitable criteria. In one implementation, the image strip 106 can show more than one row and can scroll vertically. For example, the image strip 106 might show six images across the first row and the next six images in the second row, etc. In another implementation, the image strip 106 can be located at other locations and in other orientations, e.g. vertical along the left side of the window 100.

Still image capture can be accompanied by a graphical and/or audio count-down timer 116. The count-down timer 116 includes visual indicators (e.g., "3-2-1") which can be illuminated one at a time (i.e., first "3", then "2", then "1", optionally with one-second intervals in between each illumination) to simulate the counting down of a timer. The button 104 can be illuminated, or flash, to indicate that a photograph is about to be taken. Alternatively, the background of the GUI 100 can be illuminated and/or flash. After an image is captured from the video stream, an optionally scaled placeholder image representation of the photograph (e.g., placeholder image 108) can be placed into the image strip 106.

Figure 2:
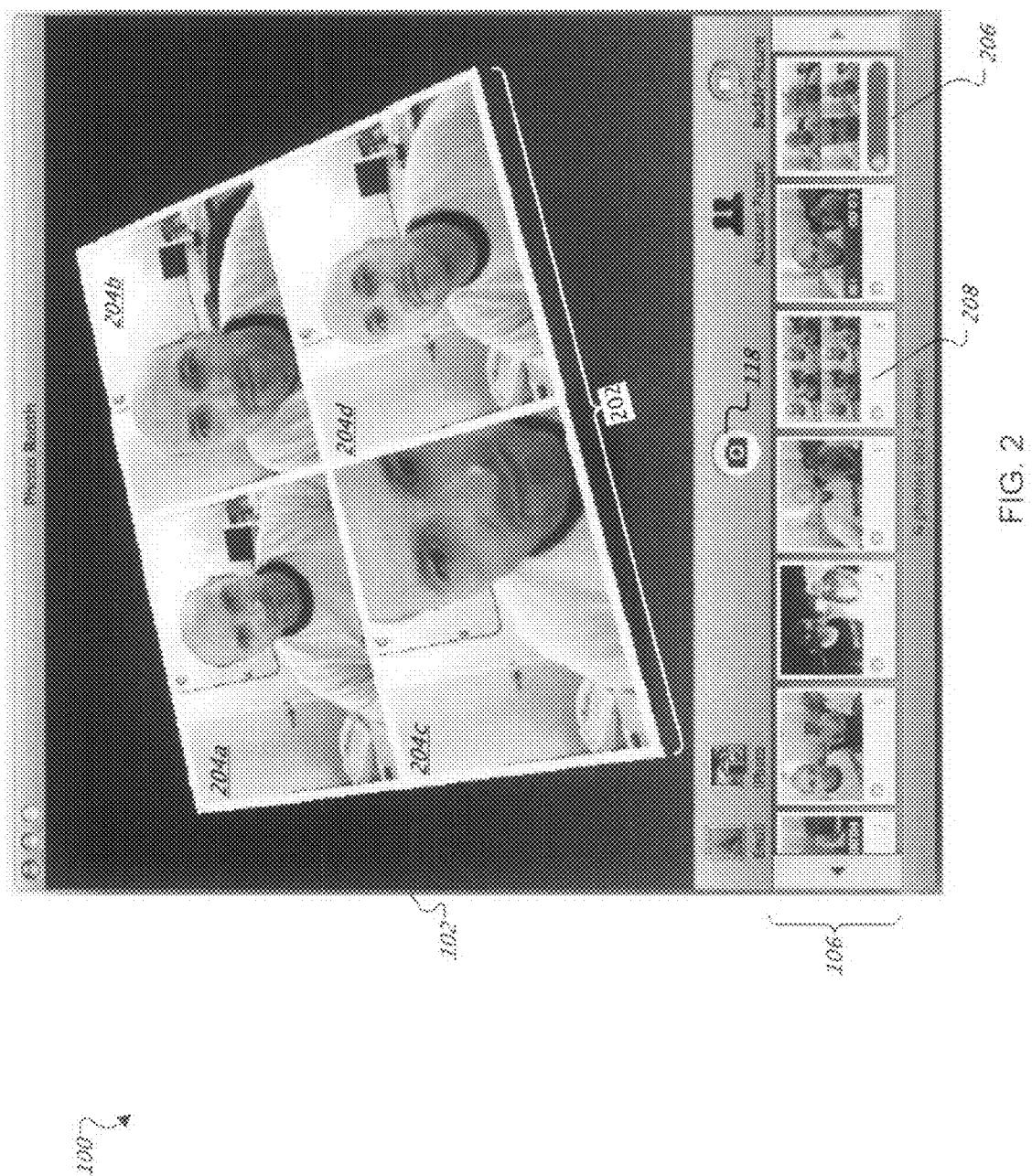
FIG. 2 shows an example GUI for viewing a multi-shot image.

FIG. 2 shows an example GUI for viewing a multi-shot image 202. In one implementation, a multi-shot image is a time-ordered set of four images selected from a video stream. However, other numbers of images are possible. The multi-shot image 202 includes four areas 204*a-d*, and each area 204*a-d* includes one of the four images. The count-down timer 116 can be used to create the multi-shot image 202. The count-down timer 116 can count down four times and take four still images from the video stream, and the four still images can be optionally scaled and placed into the four cells 204*a-d*, one image per cell. An indicator 118 shows how many images have been selected or captured during multi-shot image capture.

After a multi-shot image is created, a scaled placeholder image representation 206 of the image can be placed into the image strip 106. The image strip 106 includes a second placeholder image representation 208 of a previously captured multi-shot image. If the placeholder image 208 is selected by the user, the multi-shot image represented by the placeholder image 208 can be displayed in the region 102, as shown.

Figure 3:
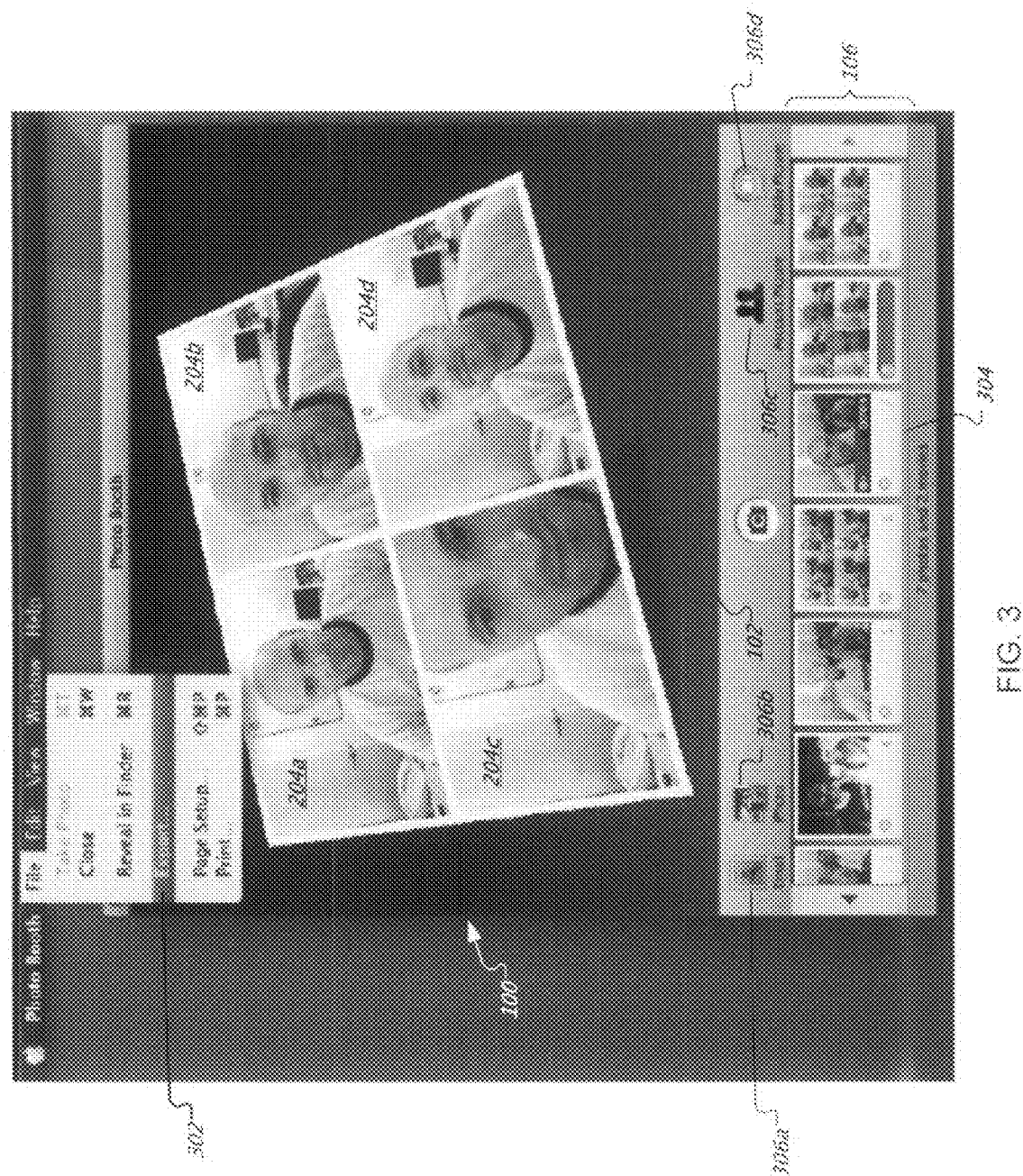
FIG. 3 shows an example GUI for exporting one or more images.

FIG. 3 shows an example GUI for exporting one or more images (e.g., a single image, a multi-shot image or a movie). A user can select a GUI control, such as an export menu item 302, to export one or more images for use in other applications. Images and multi-shot images can be exported to a number of image formats, such as GIF (Graphics Interchange Format), JPEG (Joint Photographic Experts Group) format, PNG (Portable Network Graphics) format, and TIFF (Tagged Image File Format), to name a few examples. Movies can also be exported to a number of video formats, such as Flash® (developed by Adobe Systems Incorporated), QuickTime® (developed by Apple, Inc.), MPEG (Moving Picture Experts Group) format and AVI (Audio Video Interleave) format, to name a few examples.

A user can export or send any image, multi-shot or movie represented by a placeholder in the image strip 106 to another application (target application) by selecting the placeholder image (e.g., 304) and either selecting an GUI icon 306*a-d* or dragging and dropping the placeholder onto an icon or onto another application outside of window 100. By way of illustration, selection of the application icon 306*a* can cause the image, multi-shot or movie to be added to an electronic mail message. The application icon 306*b* can be used to export an image, multi-shot or movie to a photo album application (e.g., iPhoto® available from Apple Inc). The application icon 306*c* can be used to set an account picture (e.g., a picture associated with the user who is logged into the computer). The application icon 306*d* can be used to export an image, multi-shot or movie as a still or animated "buddy picture" for use in an online chat program (such as iChat™, available from Apple Inc.). Other applications are possible.

In one implementation, an image can be transferred to a target application by saving the image, multi-shot or movie to a file and sending the target application a notification (e.g., a drag and drop GUI event) that refers to the images(s). In another implementation, an image, multi-shot or movie can be saved in a file at a location where a target application expects to find it and, optionally, with a file name that the target application will recognize.

An animation can be created from a multi-shot image or a movie and the animation can be exported (e.g., an animation can be exported as a "buddy icon" image used in a chat program). For example, the four images (e.g., 204*a-d*) included in the four cells of a multi-shot image can be used to create an animated GIF file. In the animated GIF file, the first image (e.g., 204*a*) can be displayed first, and after a short period of time (e.g., 1 second), the first image can be replaced by the second image (e.g., 204*b*), and similarly for the third and fourth images. After the fourth image has been displayed for a period of time, it can be replaced by the first image, and the animated image-replacement process using the four images of the multi-shot image can be performed repeatedly.

A movie can also be exported as an animation. For example, an animated GIF file can be created by selecting a fixed number of video frames from a movie, where each frame is separated by a specific amount of time (e.g., ten frames can be selected from a ten-second movie, with one second between each frame). Animations created from movies or multi-shot images can be exported to other video/animation formats other than animated GIF (e.g., animations can be exported to Flash® video (developed by Adobe Systems Incorporated), QuickTime® (developed by Apple, Inc.), MPEG (Moving Picture Experts Group) format and AVI (Audio Video Interleave) format, to name a few examples).

Figure 4:
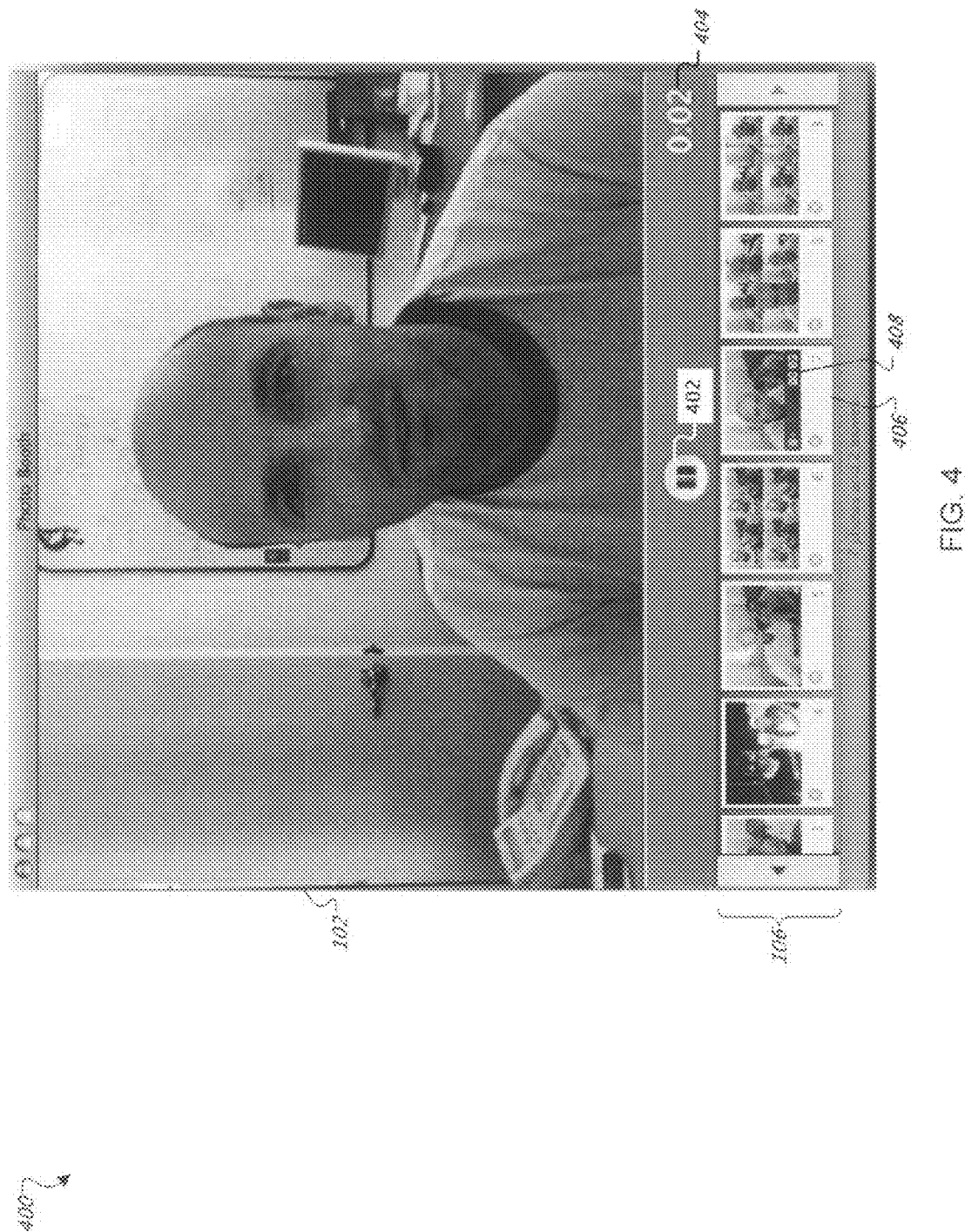
FIG. 4 shows an example GUI for recording and/or playing a movie.

FIG. 4 shows an example GUI for recording and/or playing a movie. A previously recorded movie can be displayed (i.e., "played back") in the region 102. A user can initiate the recording of a movie by selecting a record/stop button 402. A recorded movie represents a continuous stream of images captured by the image capture device over a period of time (e.g., a movie can be represented as a time-ordered set of images). A time-elapsed indicator 404 can display the elapsed time of recording (or playback) of a movie. The user can select the record/stop button 402 a second time to stop recording. Once a movie has been recorded, it can be saved, and a placeholder image representing the recorded movie can be placed in the image strip 106. A user can play back a previously recorded movie by selecting a movie placeholder image 406 in the image strip 106. After the placeholder image has been selected, the previously recorded movie can be displayed in the region 102. The recorded movie placeholder image 406 includes a text label 408 indicating the time length of the associated movie.

Figure 5:
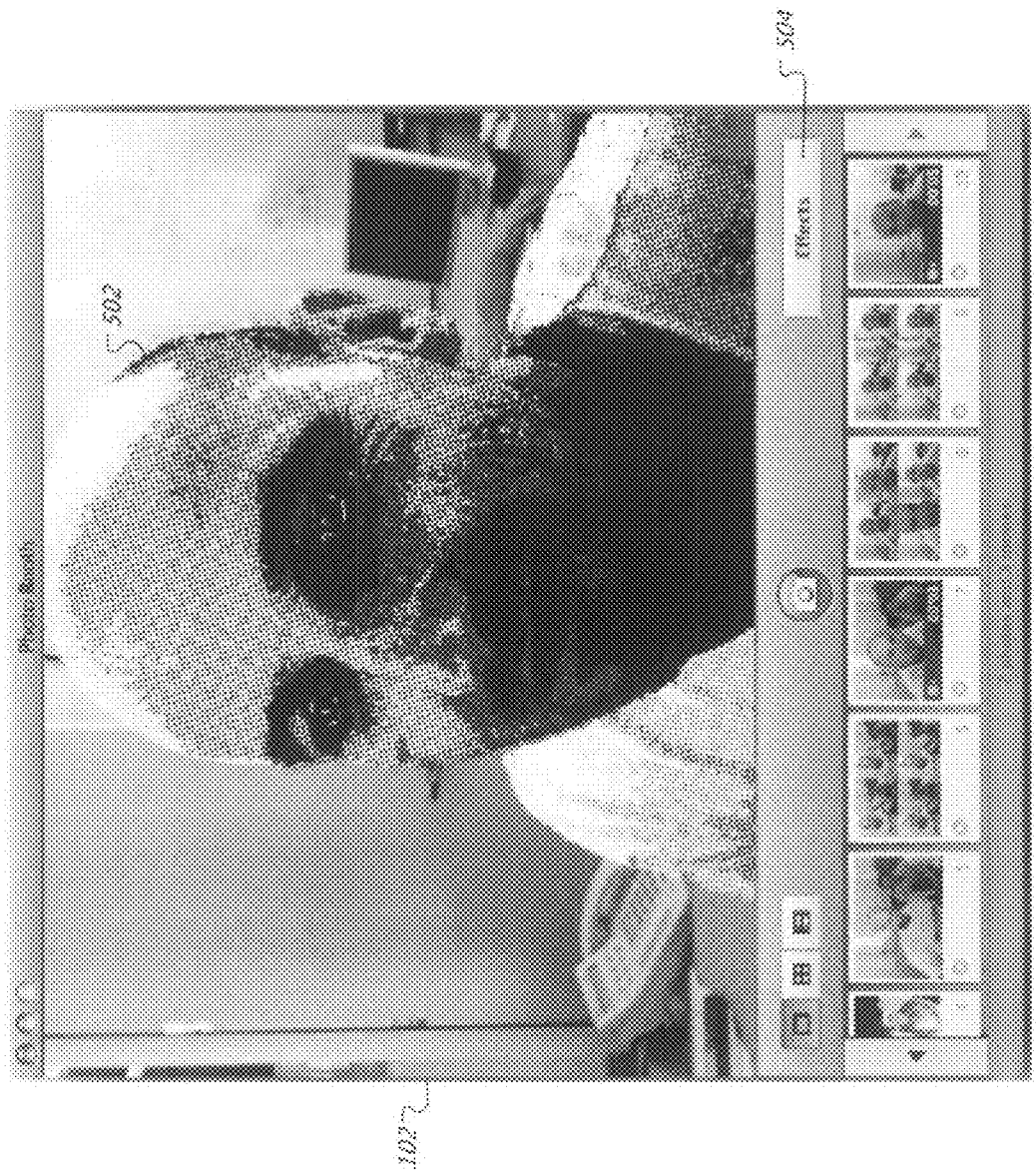
FIG. 5 illustrates a filter applied to a person appearing in an image or movie.

FIG. 5 illustrates a filter applied to a person appearing in an image or movie. A filter is a transformation or distortion of a still image, live image, multi-image or movie. A filter can include, without limitation, one or more of the following: cropping, providing a mirror image ("flipping"), adding a border surrounding the image, adding a backdrop, scaling, color manipulation, blurring, sharpening, distorting, transforming geometry, and pattern generation. An image, including a person 502, is displayed in region 102. A filter has been applied only to the person 502 (i.e., a filter has not been applied to the background). A person's face, torso, arms, hands other body parts, or combinations of these, can be automatically recognized using, for example, computer vision object identification techniques, and the filter effect limited to only those areas of the image that make up the person or the parts of interest. For example, the person's head and torso can be identified, and the filter can be limited to affect the region of the image bounded by the person's head and torso.

In response to the selection of an effects button 504, a window can appear displaying previews of a number of filters. The user can browse available filters and select a filter to apply to the image or video displayed in region 102. In one implementation, a filter can be applied to an image using the Core Image application programming interface (API) which is part of the Quartz Core framework image processing technology available from Apple Inc. The Core Image API provides access to built-in image filters for both video and still images and provides support for creating custom filters.

A user can create a custom filter using the Quartz Composer available from Apple Inc. and store the filter definition in a file. A user can select a menu item (or other user control) on the window 100 to display an import window used to import a filter definition. The user can specify the location of the custom filter file on the import window. The filter file can be read and stored so that it is available when the effects button 504 is selected. The custom filter can thus become part of a standard library of filters that can be used to transform images or movies displayed in the region 102.

Figure 6:
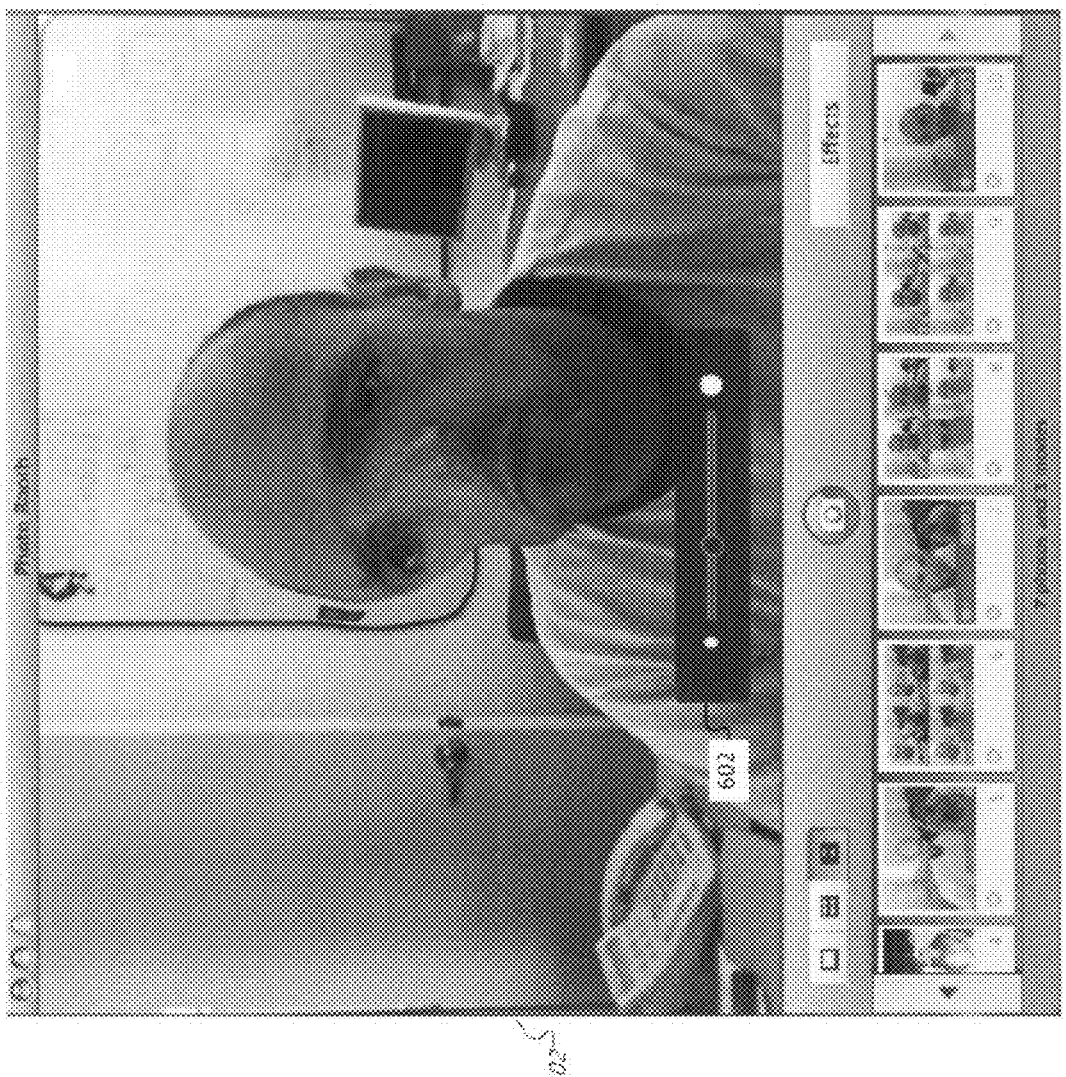
FIG. 6 shows an example GUI for dynamically adjusting one or more filter parameters.

FIG. 6 shows an example GUI for dynamically adjusting one or more filter parameters. The region 102 displays an image, a movie, or a video stream which includes a person. A "spiral" filter has been applied which distorts the face of the person, causing the content of the face to spiral inward, like a vortex, in a counter-clockwise direction. A filter can optionally have one or more parameters, where each parameter controls the magnitude of an effect of the filter. For example, the filter applied to the image in region 102 has a parameter which controls the magnitude of the spiral effect.

A slider control 602 can be used to increase or decrease the magnitude of the effect of the filter parameter. The slider control 602 appears automatically when an adjustable filter is selected. The slider control 602 can, appear in the region 102 or GUI 100 when the user moves a mouse cursor or other pointer over the region 102 or a region corresponding to the area of the GUI 100 taken up by the slider control 602, for instance.

Figure 7:
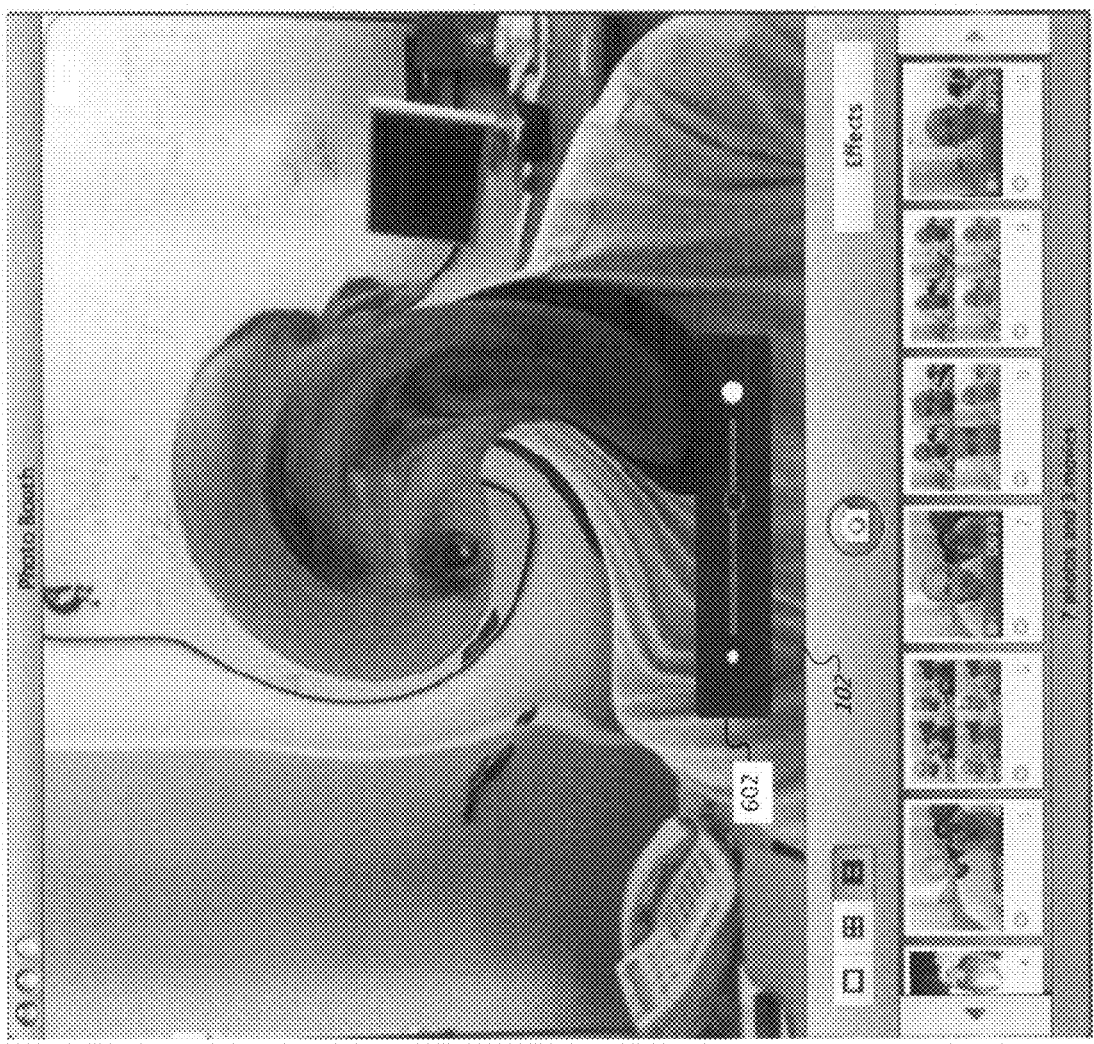
FIG. 7 shows an example GUI illustrating the effects of a filter parameter adjustment.

FIG. 7 shows an example GUI illustrating the effects of a filter parameter adjustment. The region 102 displays an image, which includes a person, which has been distorted to a larger degree than the image shown in FIG. 6. The slider bar 602 has been moved farther to the right, which has resulted in a magnification of the counter-clockwise spiral effect. Filter definitions created using the Quartz Core framework can include one or more parameter specifications which define how to adjust the magnitude of the filter effect associated with each parameter. Custom filter definitions created by users can include these parameter specifications.

Figure 8:
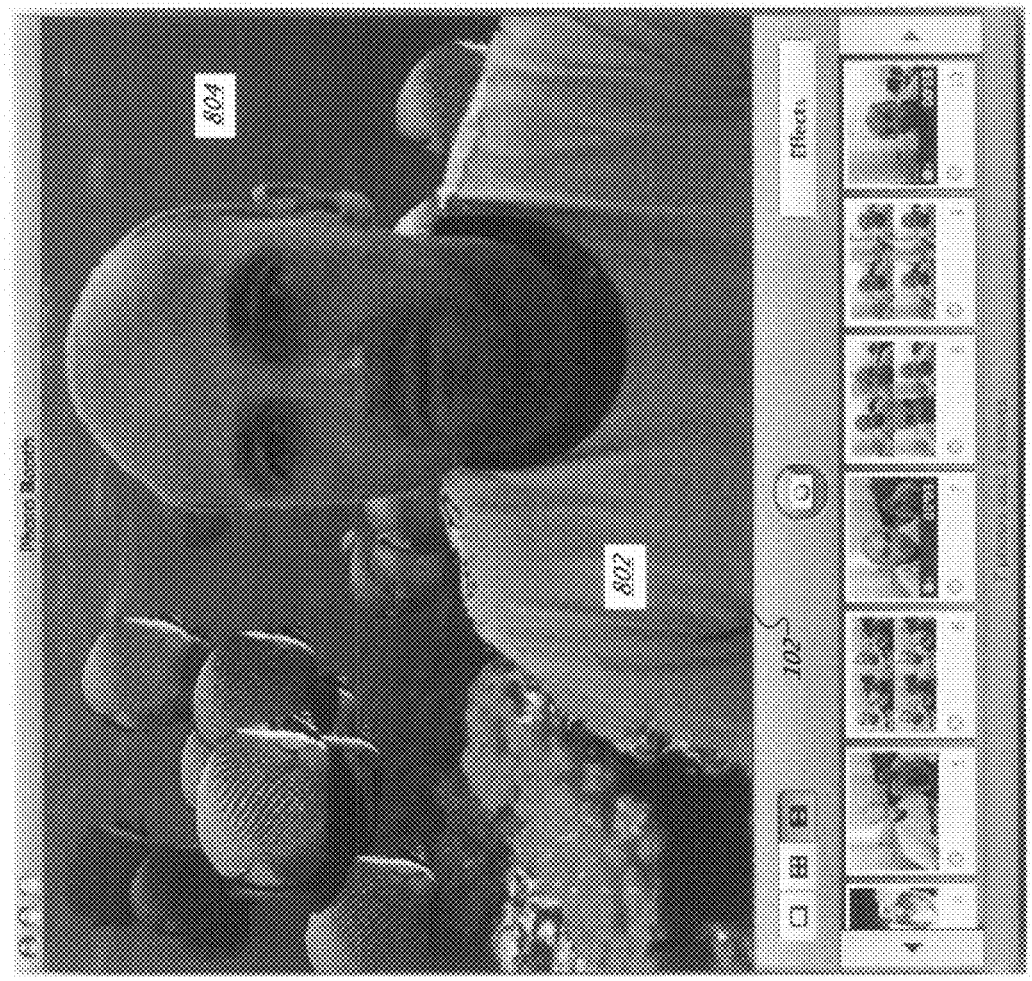
FIG. 8 shows an example GUI for changing a background of a still image, multi-image, live image or a movie.

FIG. 8 shows an example GUI for changing a background of a still image, multi-shot, live image or movie. The region 102 includes a live image of a person 802. The person 802 appears in front of a new background 804 which automatically and dynamically replaces the actual background in the image(s) (see FIG. 5). A background can be a still image or a movie, such as the swimming fish in this example. The background 804 has been prerecorded (i.e., the background 804 is not part of the live image, rather, the background 804 has replaced the background that would ordinarily be seen behind the person 802).

To replace the background of an image which includes a person in the foreground, the person can move to the side so that they are momentarily not in the picture, which allows the background of the person's environment to be recognized. When the person moves back into the live image, the background parts of the image behind the person can be identified and replaced with a custom background (such as the swimming fish background 804).

Figure 9:
FIG. 9 shows an example GUI for displaying and selecting a background.

FIG. 9 shows an example GUI for displaying and selecting a background. A mosaic is displayed in region 102 of GUI 100. Region 102 is subdivided into cells and a different background image is displayed in each cell. The custom backgrounds displayed in the cells of the mosaic can be still images or movies. For example, a cell 902 displays the movie of swimming fish seen in the background 804 of FIG. 8, and a cell 904 displays an image of the Eiffel Tower. The middle cell 906 (i.e., the "normal" cell) displays a live image. The background of the cell 906 is unchanged (i.e., has not been replaced by a custom background), and appears as captured by the image capture device. The user can select an image in one of the cells of the mosaic to change the background of the live image. The user can view other screens of backgrounds by selecting left and right arrow buttons 908a-b.

Figure 10:
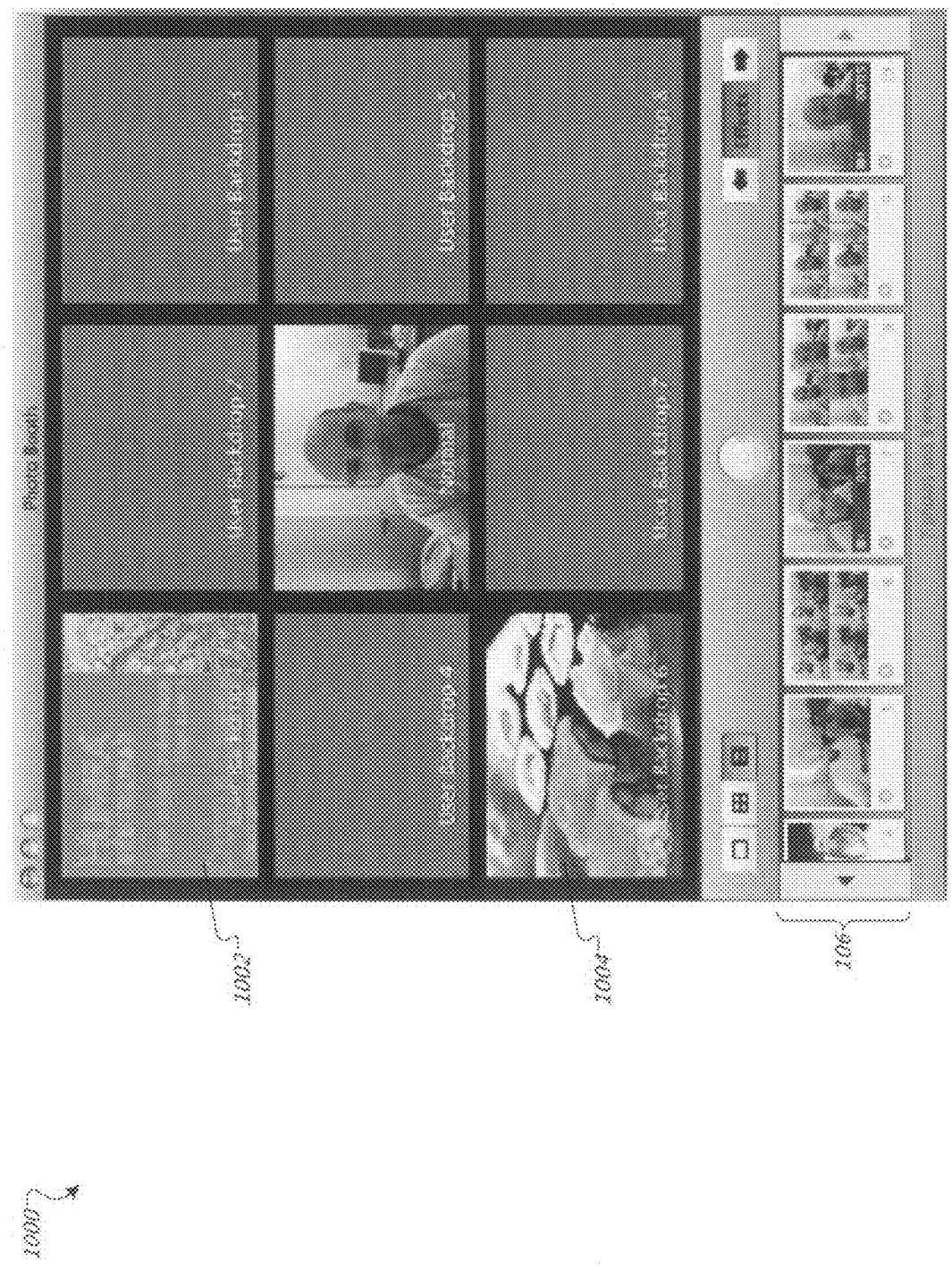
FIG. 10 shows an example GUI for displaying and selecting a user-defined background.

FIG. 10 shows an example GUI for displaying and selecting a user-defined background. A user can create one or more user-defined backgrounds. A user-defined background can be used to replace the background of images and movies (e.g., as described above in the discussion of FIG. 8). A mosaic is displayed in region 102 of window 100. Region 102 is subdivided into cells. Each cell can display a user-defined background. For example, cells 1002 and 1004 display user-defined backgrounds. A user can select a placeholder image from the image strip 106 and specify (using a menu or other user control) that the image or movie represented by the placeholder image be made available as a background image. Alternatively, the user can import an image or file created using another application and specify that the imported movie or image be made available as a user-defined background.

Figure 11:
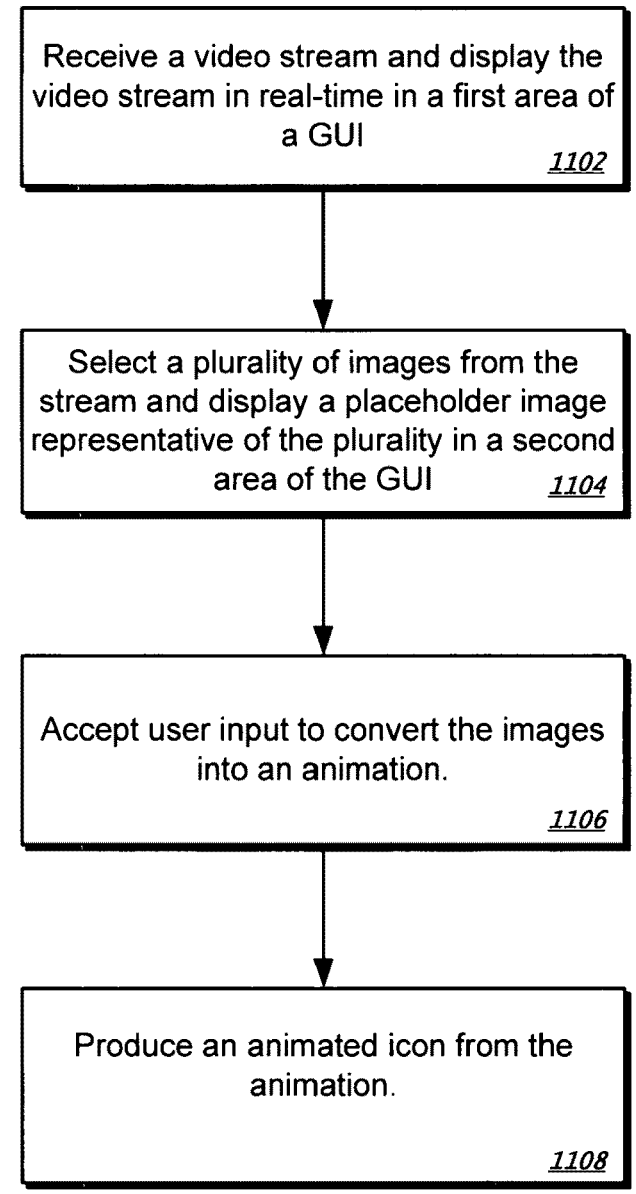
FIG. 11 shows a flowchart of an example method for producing an animated icon from a video stream.

FIG. 11 shows a flowchart of an example method for producing an animated icon from a video stream. First, a video stream is received and displayed (e.g., in real time) in a first area of a GUI (step 1102). For example, a video stream can be received from an image capture device and displayed in region 102 of the GUI 100.

A plurality of images from the stream are then selected and a placeholder image representative of the plurality is displayed in a second area of the GUI (step 1104). For example, a set of four images can be received from the stream and included in a multi-shot image (e.g., multi-shot image 202). Alternatively, a movie can be received from the stream, where the movie includes a time-ordered set of images (i.e., frames) received over a period of time. A placeholder image (e.g., 206) representing the received movie or multi-shot image can be displayed in the image strip 106. User input to convert the images into an animation is then received (step 1106). For example, the user can select a user control, such as the menu item 302, to indicate a request to export a selected multi-shot or movie into an animation. Finally, an animated icon is produced from the animation (step 1108). For example, an animated GIF icon can be created which includes an animation using either the four images of a multi-shot image or selected frames from a movie.

Figure 12:
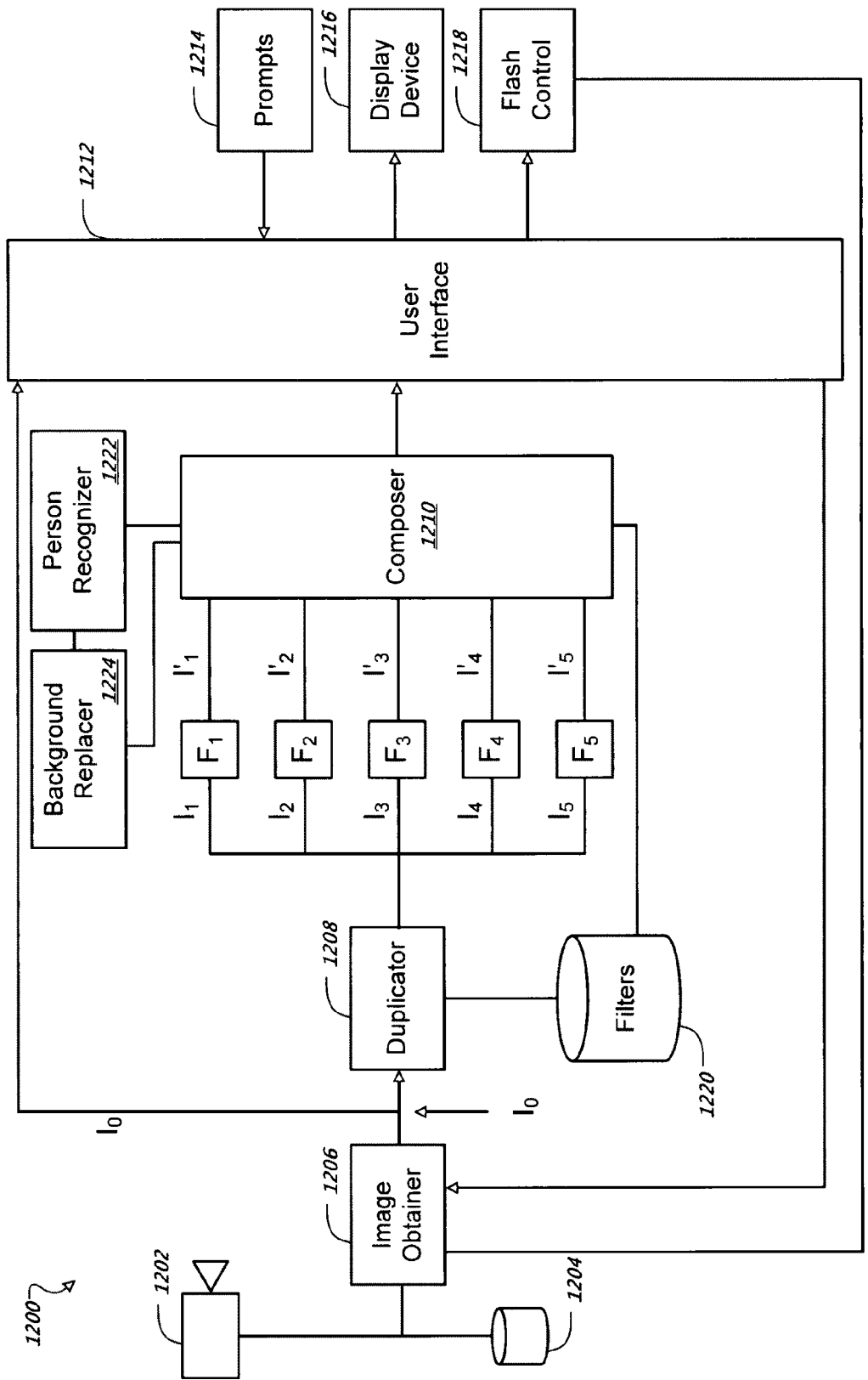
FIG. 12 shows an example system for applying effects to still images, multi-shots, live images and movies.

FIG. 12 shows a system 1200 for applying effects to still images, live images and movies. System 1200 includes an image obtainer component 1206 which receives input data (singularly or as a stream) containing compressed or uncompressed image data from an image source such as a digital image capture device 1202 or persistent storage 1204. The image capture device 1202 (e.g., digital camera) can be capable of capturing still or live images, can be wired or wireless, and can be integrated into a computer, game system, portable game system, portable media player, cellular telephone, portable music player (e.g., an iPod from Apple, Inc.), or other suitable device. In one implementation, the image capture device 1202 is an Apple iSight Video Camera, available from Apple, Inc. The iSight camera can be mounted on or located in proximity to a computer user's display device so that the user is in front of the camera, preferably centered.

The image obtainer 1206 can prompt the camera to capture an image at the behest of a user or a process. If the image capture device 1202 is only capable of capturing live images (e.g., where the input data is a continuous time-ordered sequence of video packets or frames containing image data), the image obtainer 1206 can determine which frame in the sequence corresponds to the time when the user or the process requested that an image be captured. For example, this could be the frame that coincides in time with the display device "flash". The image obtainer 1206 can optionally receive information from the camera in addition to the input data such as a light measurement and provide this information to other components.

The image obtainer 1206 can provide input data (singularly or as a stream) $I_0$ to user interface 1212, such as in the case where region 102 of window 100 is in preview mode. Input data $I_0$ can also be provided to duplicator component 1208 in which one or more copies of $I_0$ (i.e., $I_1, I_2, I_3, I_4$ and $I_5$) are each individually provided to a corresponding filter (i.e., $F_1, F_2, F_3, F_4,$ and $F_5$), which can be received from a filter data storage 1220. Each filter operates on its respective input data by applying an effect to the input data to create modified input data (i.e., $I'_1, I'_2, I'_3, I'_4, I'_5$). A filter can also apply a null effect, that is, the effect will not modify the input data. In this case, the modified input data is identical to the input data. A filter can be a user-defined filter or a pre-defined filter.

Each modified input data ($I'_1, I'_2, I'_3, I'_4, I'_5$) can be provided to a mosaic composer component 1210. The mosaic composer 1210 prepares the modified input data for display in the user interface 1212 (e.g., region 102 of window 100). This can entail extracting image data containing an image from each modified input data, scaling each extracted image to fit in a cell, and updating each cell with its associated extracted image. Alternatively, the composer 1210 can arrange each extracted image into a single mosaic which is used to update region 102 wholesale. The composer component 1210 can communicate with a person recognizer component 1222 to apply a filter to just a person identified in an image (i.e., not apply the filter to other parts of the image, as discussed above in the section on FIG. 5). The composer component 1210 can also communicate with a background replacer component 1224 to dynamically replace a background of an image or movie (e.g., as discussed above in the section on FIG. 8).

The user interface 1212 is rendered on a display device 1216 which can optionally serve as a photographic "flash" as described above. A prompt component 1214 detects when a user has selected an effect. The prompt component 1214 also detects when a user has requested (e.g., by selecting the button 104) that an image be captured and communicates this to the user interface 1212. The user interface 1212 can notify the image obtainer 1206 so that the image can be captured (e.g., after a count-down timer has completed). The user interface can also notify a flash component 1218 of the requested image capture so that the flash component 1218 can "flash" the display device at a time coinciding with the image capture.

Figure 13:
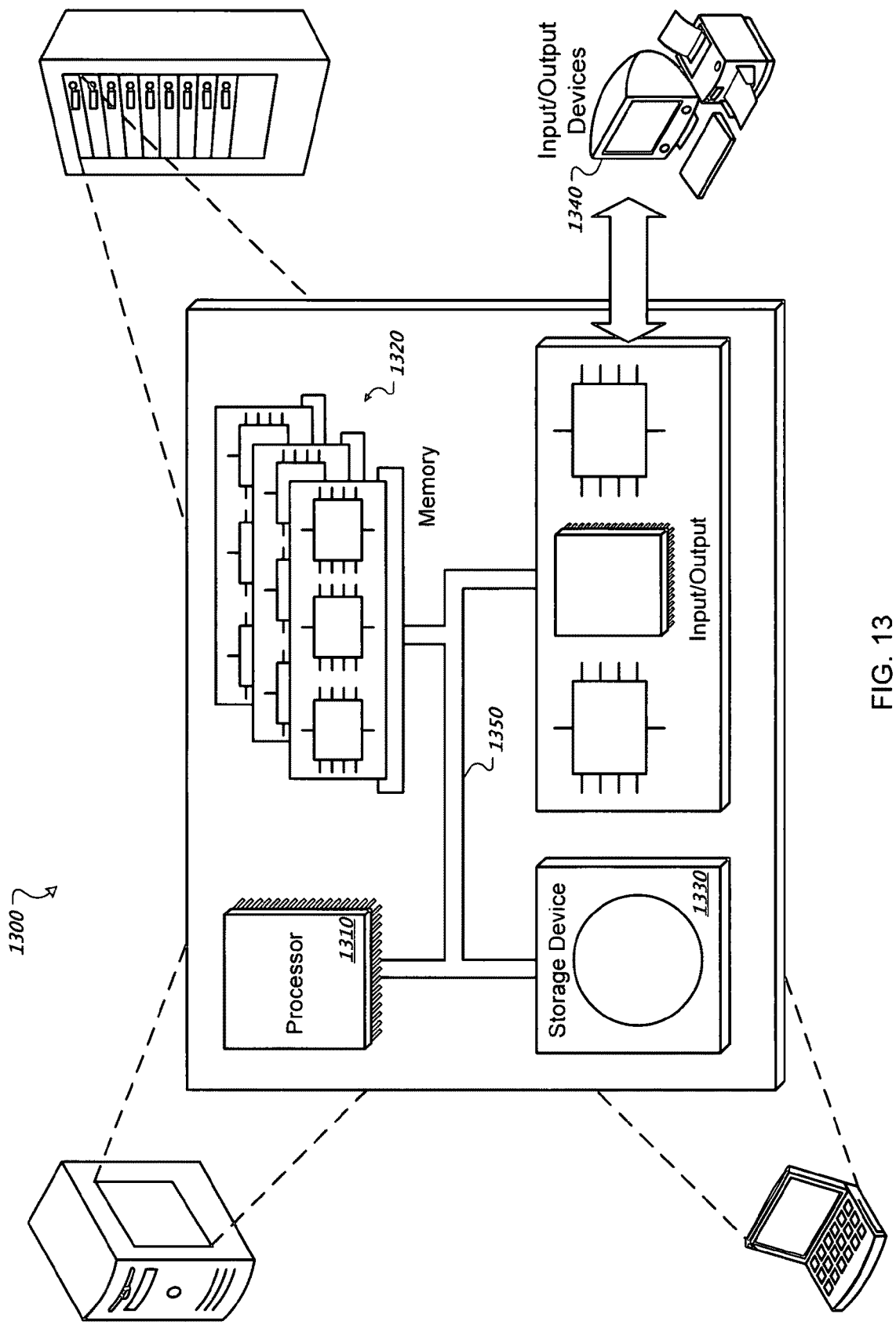
FIG. 13 is a schematic diagram of a generic computer system.

FIG. 13 is a schematic diagram of a generic computer system 1300. The system 1300 can be used for practicing operations described in association with the method 1100. The system 1300 can include one or more processors 1310, a memory 1320, a storage device 1330, and input/output devices 1340. Each of the components 1310, 1320, 1330, and 1340 are interconnected using a system bus 1350. The processor 1310 is capable of processing instructions for execution within the system 1300. Such executed instructions can implement one or more components of system 1200, for example. Each processor 1310 is a single or multi-threaded, and single or multi-cored. The processor 1310 is capable of processing instructions stored in the memory 1320 or on the storage device 1330 to display graphical information for a user interface on the input/output device 1340.

The memory 1320 is a computer readable medium such as volatile or non volatile that stores information within the system 1300. The memory 1320 could store data structures representing history trees and reduced history trees for complex solids, for example. The storage device 1330 is capable of providing persistent storage for the system 1300. The storage device 1330 may be a floppy disk device, a hard disk device, an optical disk device, or a tape device, or other suitable persistent storage means. The input/output device 1340 provides input/output operations for the system 1300. In one implementation, the input/output device 1340 includes a keyboard and/or pointing device. In another implementation, the input/output device 1340 includes a display unit for displaying graphical user interfaces.

The input/output device 1340 can provide input/output operations for an image processing system. The image processing system can include computer software components such as the image obtainer 1206 and the composer component 1210. Such software components 1206 and 1210 can be persisted in storage device 1330, memory 1320 or can be obtained over a network connection, to name a few examples.

An electronic document (which for brevity will simply be referred to as a document) does not necessarily correspond to a file. A document may be stored in a portion of a file that holds other documents, in a single file dedicated to the document in question, or in multiple coordinated files.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:
1. A computer-implemented method, comprising:
receiving one or more images;
accepting an icon generation input to convert the one or more images into an animated icon;
producing the animated icon from the one or more images;
providing for display one or more application icons, each application icon representing an application program;
receiving a selection of the one or more application icons; and in response to the selection, transferring the animated icon to an application program represented by the selected application icon to be used as an icon of a logged-in user of the application program.

2. The method of claim 1 where each image of the one or more images has a background, the method further comprising:
for each image of the one or more images, substituting the image's respective background with a new background.

3. The method of claim 2 where the new background is a static image or a movie.

4. The method of claim 1, further comprising:
for each image of the one or more images:
recognizing a person captured in the image; and
applying a filter to the recognized person, but not applying the filter to other parts of the image.

5. The method of claim 1 where receiving the one or more images includes capturing a time-ordered set of images; and where producing the animated icon from the one or more images includes:
creating a multi-shot image having multiple cells, including:
selecting a specified number of images from the time-order set of images where the specified number of images are separated by time period; and
placing each of the selected images into a cell of the multi-shot image, where producing the animated icon includes producing the animated icon from the multi-shot image using the image in each cell of the multi-shot image.

6. The method of claim 5, further comprising:
applying a filter to each image in the multi-shot image, where application of the filter is for the image as a whole or only for a person captured in the image.

7. The method of claim 6, further comprising:
incorporating the filter into a set of standard filters.

8. The method of claim 7, further comprising:
accepting user input to dynamically adjust one or more parameters of the filter.

9. The method of claim 5, where capturing the time-ordered set of images includes:
receiving a video stream and displaying the video stream in a first area of a graphical user interface (GUI); and
capturing the time-ordered set of images from the video stream.

10. The method of claim 9, where the video stream is a real-time video stream received from an image capture device.

11. The method of claim 10 where the image capture device is positioned in front of the user.

12. The method of claim 5, where producing the animated icon from the one or more images includes producing the animated icon from the multi-shot image.

13. The method of claim 12, where producing the animated icon from the multi-shot image includes:
producing an animation using images in the cells of the multi-shot image;
providing for display the animation in a preview mode; and
producing the animated icon from the animation.

14. The method of claim 1, where the icon of the logged-in user includes an account icon of the logged-in user.

15. The method of claim 1, where:
the application program represented by the selected application icon includes a chat program; and
the icon of the logged-in user includes a buddy icon of the logged-in user in the chat program.

16. A computer program product, encoded on a storage device, operable to cause data processing apparatus to perform operations comprising:
receiving one or more images;
accepting an icon generation input to convert the one or more images into an animated icon;
producing the animated icon from the one or more images;
providing for display one or more application icons, each application icon representing an application program;
receiving a selection of the one or more application icons; and
in response to the selection, transferring the animated icon to an application program represented by the selected application icon to be used as an icon of a logged-in user of the application program.

17. The program product of claim 16 where each image of the one or more images has a background, the operations further comprising:
for each image of the one or more images, substituting the image's respective background with a new background.

18. The program product of claim 17 where the new background is a static image or a movie.

19. The program product of claim 16, the operations further comprising:
for each image of one or more images:
recognizing a person captured in the image; and
applying a filter to the recognized person, but not applying the filter to other parts of the image.

20. The program product of claim 16 where receiving the one or more images includes:
selecting four non-adjacent images from a video stream where the four non-adjacent images are separated by time.

21. The program product of claim 20, the operations further comprising:
applying a filter to each image in the video stream, where application of the filter is for the image as a whole or only for a person captured in the image.

22. The program product of claim 21, the operations further comprising:
incorporating the filter into a set of standard filters.

23. The program product of claim 22, the operations further comprising:
accepting user input to dynamically adjust one or more parameters of the filter.

24. The program product of claim 20 where the video stream is a real-time video stream received from an image capture device.

25. The program product of claim 24, where producing the animated icon from the one or more images includes creating a multi-shot image having multiple cells, each cell including an image selected from a time-ordered set of images.

26. A system comprising:
a graphical user interface (GUI);
a video camera; and one or more computers operable to perform operations comprising:
receiving one or more images;
accepting an icon generation input to convert the one or more images into an animated icon;
producing the animated icon from the one or more images
providing for display one or more application icons, each application icon representing an application program;
receiving a selection of the one or more application icons; and
in response to the selection, transferring the an animated icon to an application program represented by the selected application icon to be used as an icon of a logged-in user of the application program.

* * * * *